United States Patent [19]

Quirey et al.

[11] 4,356,389
[45] Oct. 26, 1982

[54] BAR CODE SCANNER INTERFACE

[75] Inventors: Tim A. Quirey, Davie; Thomas V. D'Amico, Boca Raton, both of Fla.

[73] Assignee: Motorola Inc., Schaumburg, Ill.

[21] Appl. No.: 163,855

[22] Filed: Jun. 27, 1980

[51] Int. Cl.³ .................................................. G06K 7/14
[52] U.S. Cl. .............................. 235/455; 340/146.3 AG
[58] Field of Search ............... 235/455; 340/146.3 AG; 328/162-164

[56] References Cited

U.S. PATENT DOCUMENTS 3,225,213 12/1965 Hinrichs et al. ........... 340/146.3 AG
3,909,594 9/1975 Allais et al. .
3,925,639 12/1975 Hester .
3,991,299 11/1976 Chadima, Jr. et al. .
4,013,893 3/1977 Hertig .
4,240,064 12/1980 DevChoudhury .................. 235/455

Primary Examiner—Thomas A. Robinson
Attorney, Agent, or Firm—James W. Gillman; James S. Pristelski; Margaret M. Parker

[57] ABSTRACT

The positive and negative peak detectors in the interface are reset during each input signal cycle and the reference level used for comparison is switched from one level to another to improve decoding accuracy, with each level determined by the previous two peaks. The input signal is DC coupled and DC offset. The scanner light source is pulsed by a low duty cycle power source if code is not being scanned. The circuit is applicable for digitizing any analog signal with varying amplitudes and/or DC levels and is adaptable to microprocessor control.

8 Claims, 9 Drawing Figures

BAR CODE SCANNER INTERFACE

BACKGROUND OF THE INVENTION

This invention relates to the field of digitizing analog waveforms as for decoding bar patterns and, more particularly, to the provision of a switched reference or threshold signal for a digitizing circuit.

Bar code scanners or "light pens" have been developed for detecting patterns of light and dark bars, sometimes referred to as product codes, and are frequently used in checkout counters and for automatic inventorying. Each product package is marked with an identifying pattern of dark bars on a light background, the bars and spaces varying in width, and when the pattern is scanned by a device including a light source and a reflected-light detector, a signal is produced by which the product, package size and manufacturer can be identified. When the scanning device is built into a grocery checkout counter, a high power light source, such as a laser, can be used, with the device being essentially unlimited as to size and power consumption. When, however, the scanning device is hand-held and battery-powered, the size, cost and power requirements become very restrictive. This, inevitably, causes some reduction in bar code detection speed and/or accuracy. Since product packages vary considerably in the light absorption of the bars and the reflectivity of the "white" background (even transparent backgrounds are sometimes used), black/white transitions are not always accurately detected and decoding accuracy suffers as a result. The coded area may also be damaged in handling with resultant loss of contrast between bars and spaces.

Additional problems in interfacing with scanning devices include the fact that the output signals of scanning devices of different manufacturers vary as to DC level and AC signal amplitude, and even those from one manufacturer may vary from unit to unit. This has often required factory matching of circuit components to a given manufacturer's product or providing a manually adjustable component for use after in-the-field scanner replacement. As noted, power requirements are important in a portable battery-powered device, and it would be desirable to energize the scanner light source for as little of the time as possible without reducing code detection capability or making the scanner difficult to use.

It is known to derive a varying reference signal for the comparator of an interface by generating one signal which is always at least as positive as the positive peaks of the signal and another which is at least as negative as the negative peaks, and maintaining the reference signal at or near the "median" of the two signal levels, but this method does not significantly improve the accuracy of the digitized signal.

SUMMARY OF THE INVENTION

It is therefore an object of the present invention to provide an improved digitizing circuit as for a bar code scanner interface.

It is another object to provide increased tolerance to the DC level and widely varying AC amplitude of the interface input signal.

It is also an object to provide for power conservation for a battery-powered scanner.

These objects and others are obtained in the circuit of the present invention by coupling a memory circuit to the output of the scanner. A complementary pair of peak detectors is coupled to the memory circuit, and the detectors are reset during each cycle, one after each transition of the digitized signal. A ratio switching circuit is coupled to both detector outputs and to the reference input of a comparator. By switching the signal ratio at each transition, the reference threshold supplied to the comparator will be more easily crossed by a signal from a scanner. The digitized output signal from the comparator will thus be more accurate, providing for enhanced accuracy in the signal decoder. The interface input is DC coupled for stability and the input signal is given an additional DC offset in the input amplifier, thus allowing much greater tolerance to scanner DC output characteristics. In addition to the usual bar and space data recovery, the scanner signals are first examined to determine whether the scanner is on a white area (border). If not, the light source is pulsed at a very low duty cycle until a white area is detected. Several other conditions which indicate non-decodable scanner signals will also cause a return to the low duty cycle mode.

DETAILED DESCRIPTION OF A PREFERRED EMBODIMENT

For ease of understanding., the invention will be described hereinbelow in the context of an interface for a bar code scanner (or light pen), and as used for reading product codes, but the invention is applicable to the digitizing of any analog signal, particularly to a signal having widely varying amplitudes and/or DC levels.

Figure 1:
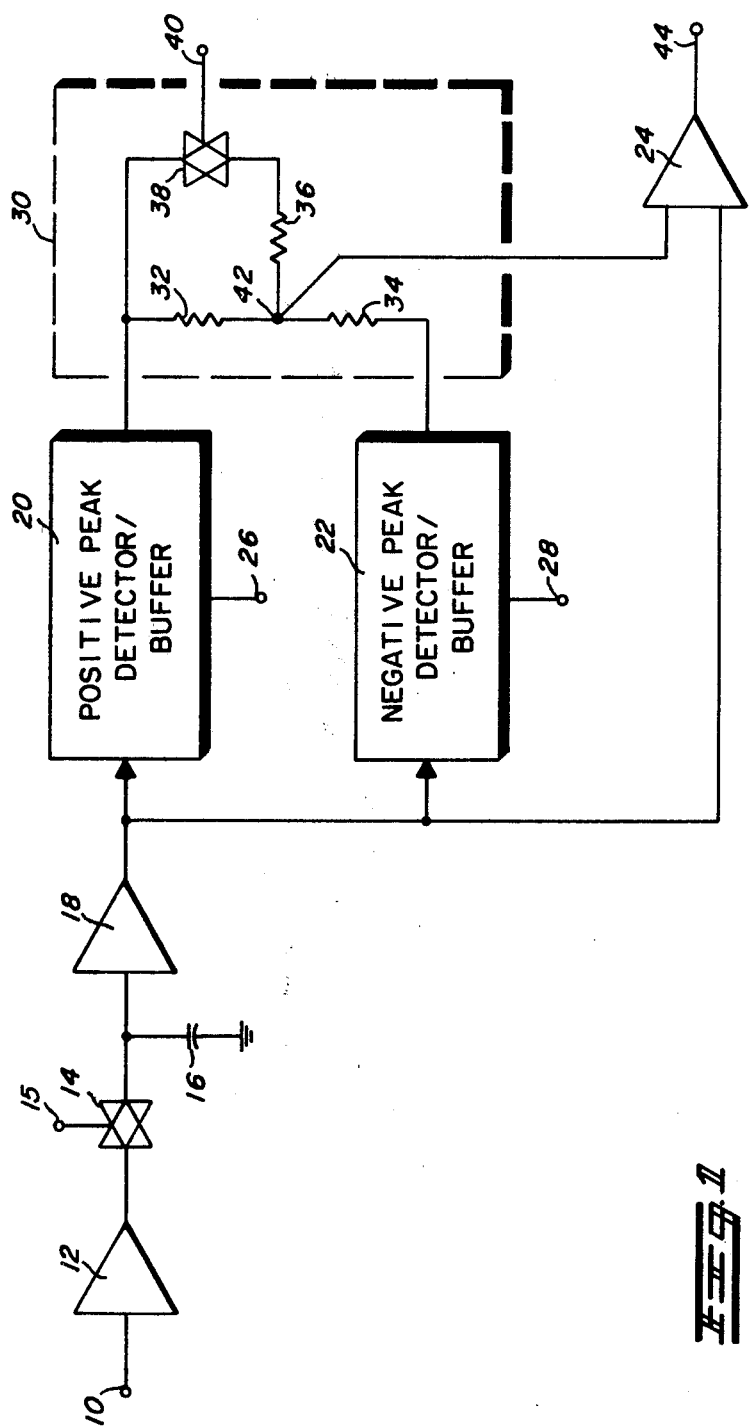
FIG. 1 is a block diagram of the interface of the present invention.
Figure 2:
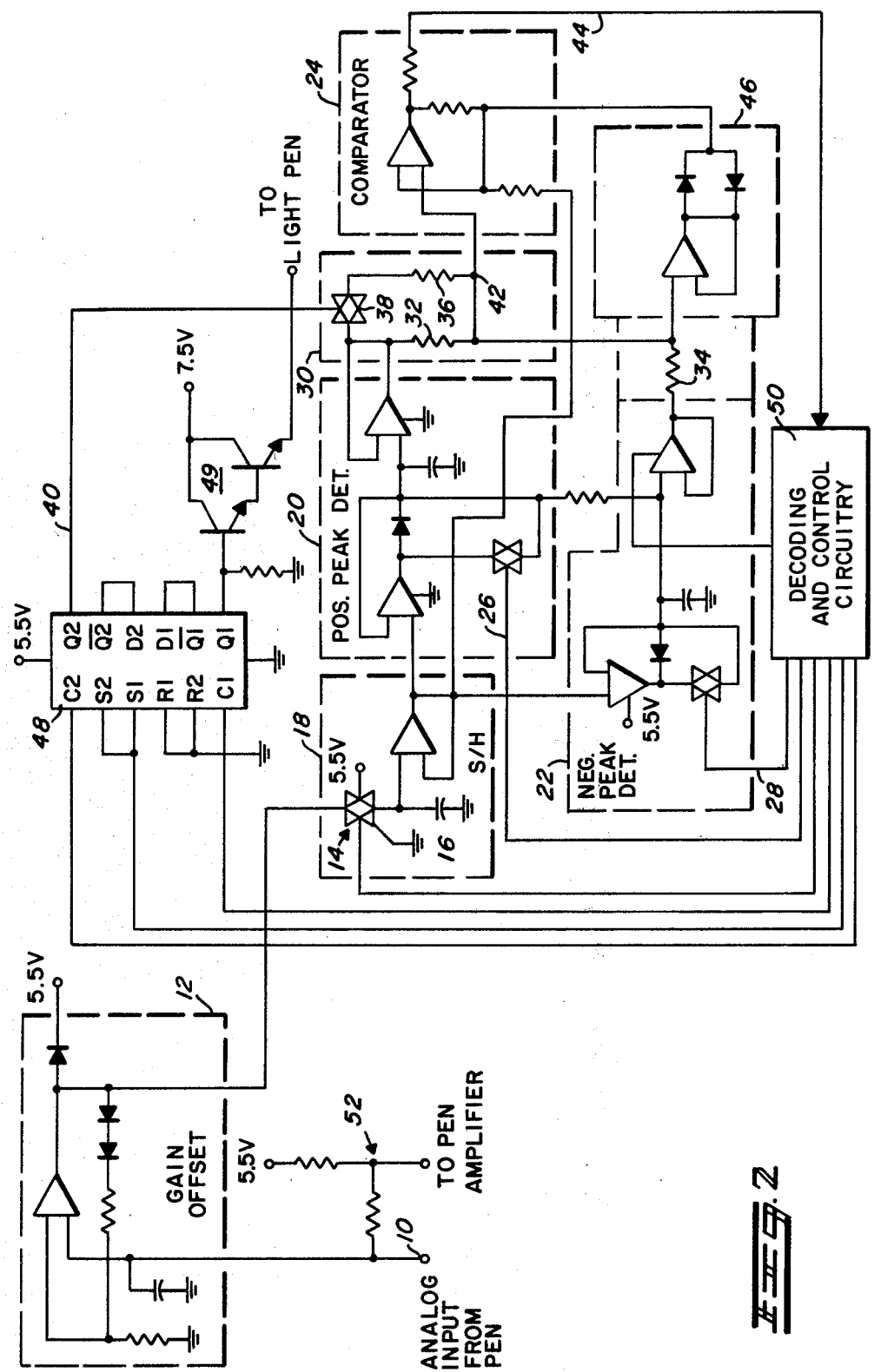
FIG. 2 is a logic diagram of the interface of FIG. 1 with additional blocks added.

In the block diagram of FIG. 1, the input signal which is to be digitized and, in some applications decoded, is received at an interface input terminal 10. In those applications where a DC offset is desirable, the terminal 10 is coupled to an amplifier 12 providing the offset. The amplifier 12 output signal is coupled through a switch 14 which may be a voltage-controlled electronic switch with a control terminal 15. The switch 14 is coupled to memory circuit 16 which may be simply a capacitor. The memory circuit 16 is actually a part of a sample-and-hold amplifier 18 as shown in FIG. 2. The output of the S/H amplifier 18 is coupled to a positive peak detector 20, a negative peak detector 22 and a comparator 24. The positive peak detector 20 has a reset terminal 26 and the negative peak detector 22 has a reset terminal 28. The reset function will be discussed with respect to FIGS. 4A, 4B. The peak detector outputs are coupled to a ratio switching network 30 (dashed line) which includes resistors 32, 34, 36, a voltage-controlled switch 38 with control terminal 40, and an output point 42. The ratio of the values of the resistors 32, 34 and 36 will be 6:3:2, the actual values depending on other factors in the circuit. Thus, when the switch 38 is closed and resistors 32, 36 are in parallel, the voltage at the point 42 will be two-thirds the voltage between the two peak detector outputs, meaning that a black to white transistion is anticipated. Likewise, if the switch 38 is open and resistor 36 is out of the circuit, the voltage at the point 42 is one-third the voltage between the peak detector outputs. It will be apparent hereinafter that the control signals at the terminal 40, and the terminals 15, 26, 28 could be provided by discrete elements or by a microprocessor if one is available in a specific application of the invention. The output point 42 is coupled as a reference source to the comparator 24. The output of the comparator 24 at a terminal 44 will then be a digitized signal in response to the input at terminal 10, using the output signal from the point 42 as the reference or threshold signal.

FIG. 2 includes more detail of the elements of FIG. 1, using the same reference numerals and with standard logic elements. Also shown are a hysteresis control stage 46 which is coupled to the comparator 24, which provides a symmetrical and constant amount of hysteresis for comparator 24, regardless of the DC operating point of the circuit, a flip-flop 48 and switching circuit 49 for controlling the current in the scanner light source (see FIG. 3), a decoding and control block 50 and power supply circuit 52 for the scanner (pen) amplifier.

Figure 3:
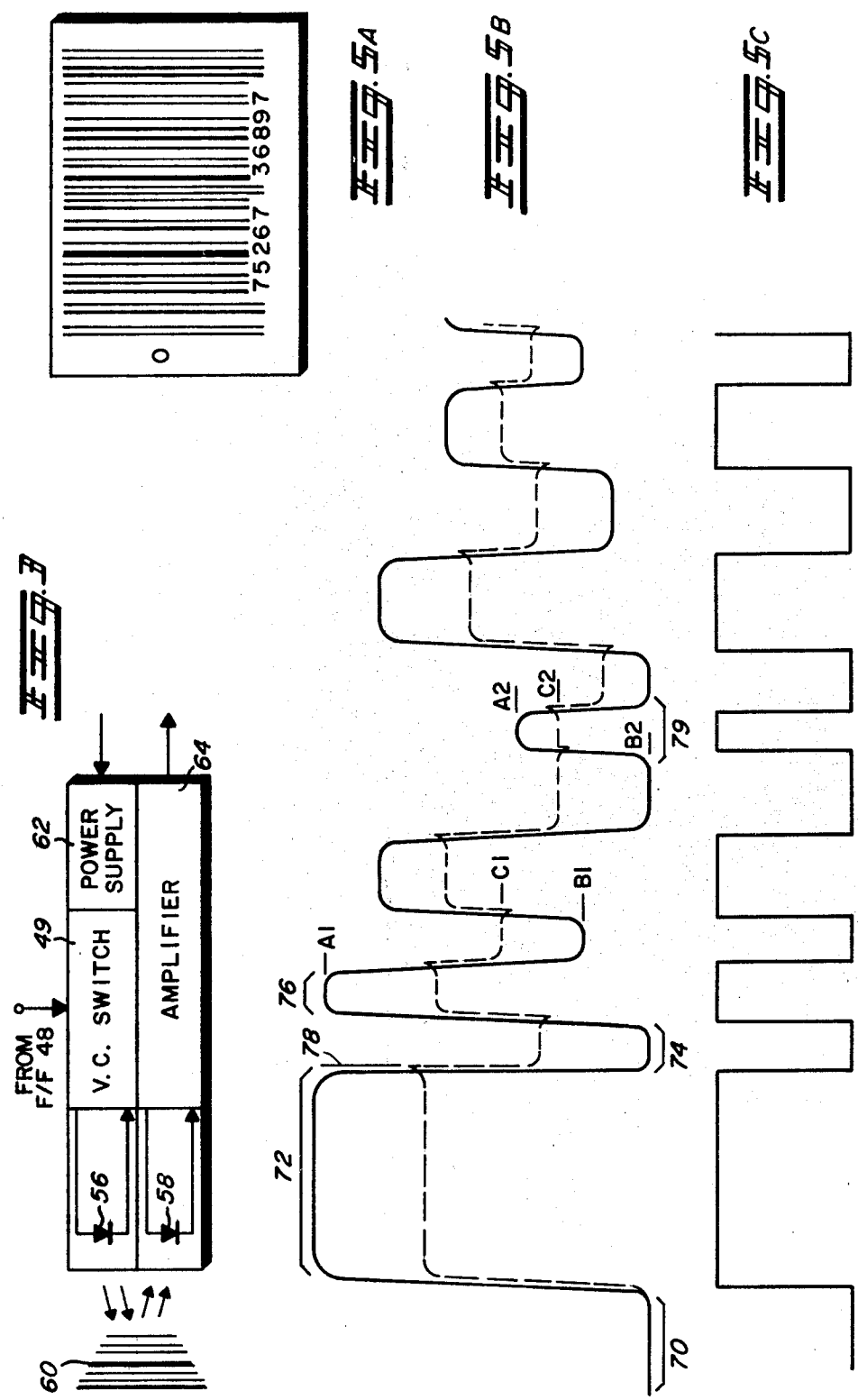
FIG. 3 is a diagram of a scanner as used with the interface.

FIG. 3 is a diagram of a typical scanner, showing a light source 56 such as an LED, a photodetector 58 for detecting light reflected from each bar and space of a bar code 60 such as Code 39 (partially shown). A power supply 62, which may be located elsewhere in the system, supplies current to operate a signal amplifier 64 and, through the voltage-controlled switch 49, to the light source 56. The output of the amplifier 64 is coupled to the terminal 10 of the interface.

Figure 4:
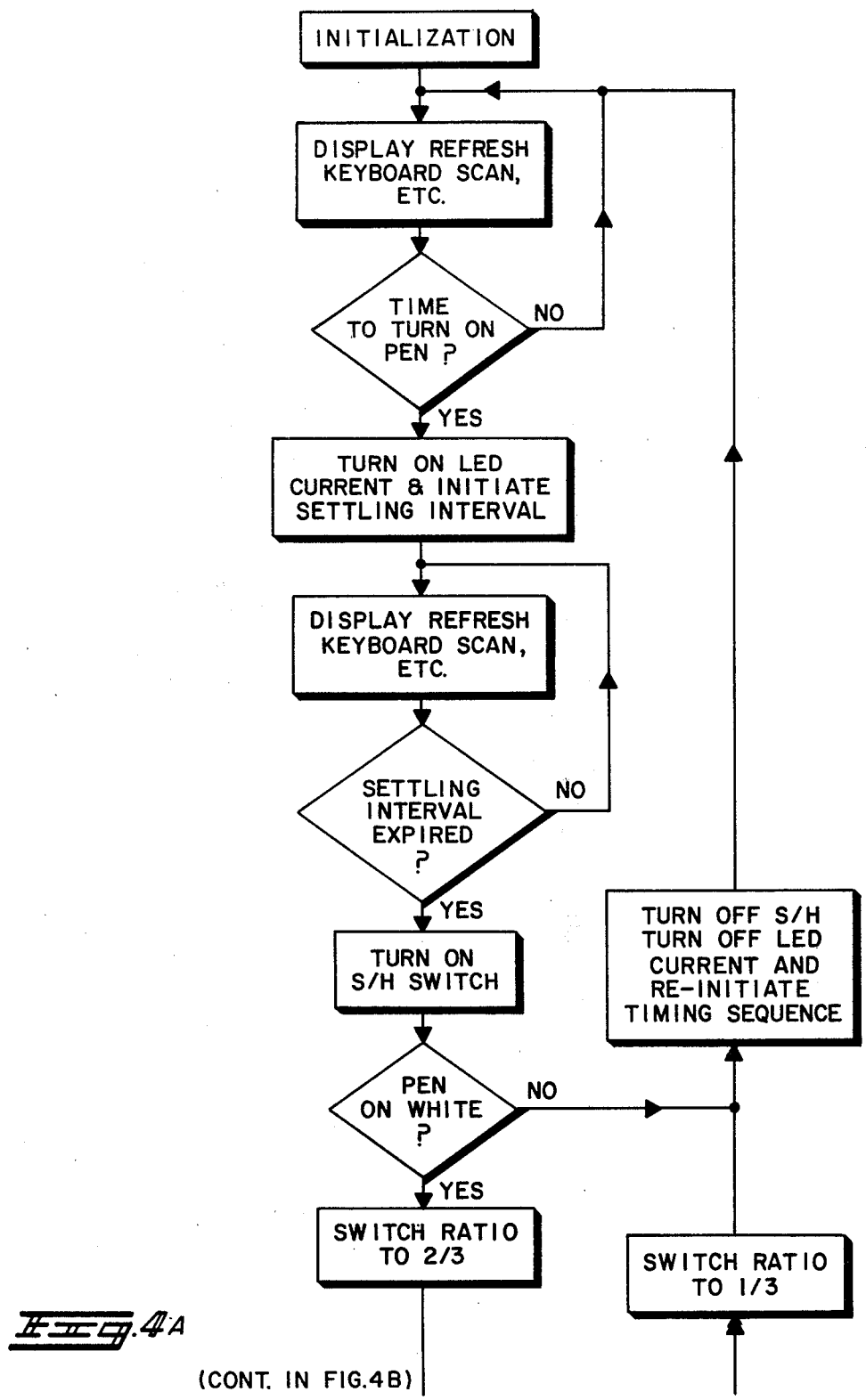
FIGS. 4A and 4B comprise a flowchart of the operation of the invention.
Figure 5:
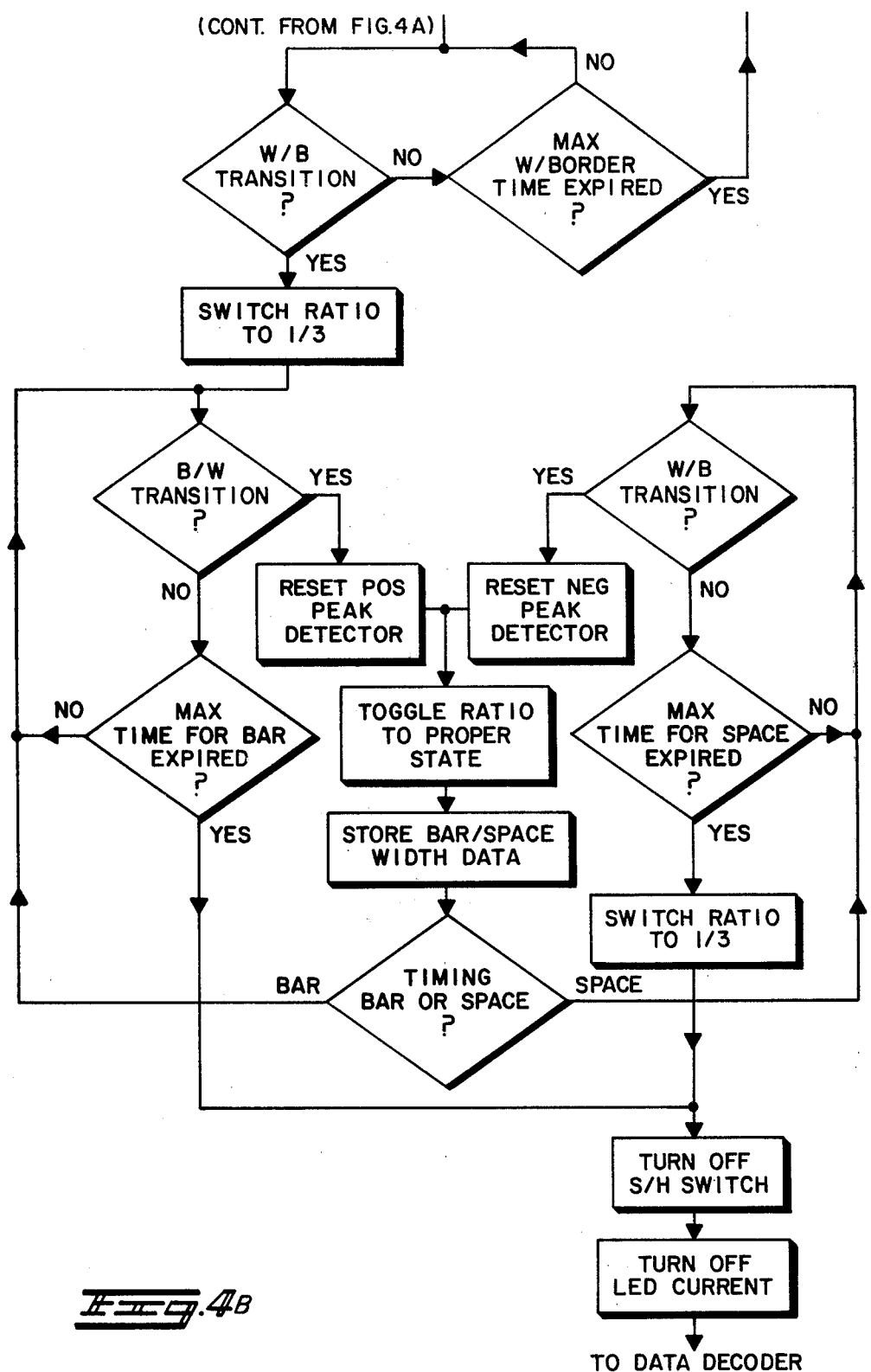
FIGS. 5A, B and C are, respectively, a bar code and the interface input and output signals for a portion of the bar code.

FIGS. 4A, 4B comprise a flowchart of the operation of the invention, starting at initialization. During initialization, the peak detectors are reset, the LED is off, the reference ratio is set to one-third, and the LED off-time is initialized. Other functions, such as data transmission, may be necessary prior to turning on the light source (LED). After these are completed and after the LED "off" time interval has expired, a "yes" answer is made to the question "time to turn on pen?". It is to be noted that such a decision can be made by a discrete timer or by a timing loop in a microprocessor. The LED current is turned on and a settling interval is initiated. The scanner output is allowed to stabilize during this interval and any other functions which may be necessary during this period are completed, then the switch 14 is closed. "Display refresh" and "keyboard scan" are merely representative of such functions in one application of the invention. The input signal is then analyzed to determine whether the pen is on a white background or on a black bar or in free air. It should be mentioned here that in most manufacturers' scanning devices, the signal output for "free air" or a black bar is essentially 0 volts. If the pen is not on a white background, the switch 14 is opened, the LED current source is turned off and the timing sequence is reinitiated. If, however, the pen is on white, the reference ratio of the comparator threshold reference signal is switched to two-thirds of the input signal. Reference levels and the ratios will be discussed more completely with respect to FIG. 5, but at this point, it will merely be understood that when a white to black (negative going) transition is expected, the reference ratio will be two-thirds, and when a black to white (positive going) transition is expected, the reference ratio will be one-third. A reference ratio of two-thirds implies that the reference voltage is equal to the voltage value at the negative peak detector plus two-thirds of the voltage difference between the two peak detector outputs.

As the scanner is moved across the white border, a white to black transition is expected (FIG. 4B). If such a transition is not detected and the maximum time allowed by the system for a white border has not expired, the circuitry will continue to look for a white to black transition. If the maximum allowed time has expired, the ratio will switch to one-third, then the switch 14 and the LED current will be turned off. If a white to black transition is detected before the end of the allowable white border time, the negative peak detector is reset to the present value of the peak detector input signal and the ratio is switched to one-third. The peak detector reset signals are of short duration in order not to interfere with the acquisition of the most positive or most negative signal peak. Now that a bar is being scanned, a black to white transition is now anticipated, and if it is not detected during the maximum time allowed for a black bar, the switch 14 will be turned off as before and the LED will return to a 2.5% duty cycle. If the black to white transition is detected before the maximum time has expired, the positive peak detector is reset and the ratio is switched to two-thirds, the bar width data is stored for subsequent decoding and, since the device will now be timing a space, a white to black transition is anticipated. If this transition is not detected before the end of the maximum time allowed for a space, the ratio will switch to one-third, the switch 14 and LED current will be turned off. If the white to black transition is detected within the maximum allowable time, the negative peak detector is reset, the ratio is switched to one-third and the space width data is stored. Since the system is now timing a bar, the system returns to watching for a black to white transition. Thus, within certain time restrictions, the system will continue to look for signal transitions and will reset the peak detectors and the ratios as required for maximum decoding accuracy.

In FIG. 5A, a sample product or bar code is shown, and will be seen to consist of a number of black bars of various widths on a light background, with various spacings between the bars. A scanner would normally be moved across the pattern from one side to the other and the visible or infrared light from the LED 56 would be reflected to the photodetector 58 from the sequence of bars and spaces, producing an analog signal of more or less rectangularly-shaped pulses. It is obvious that the degree of whiteness of the background and the reflectivity of the bars will have a great deal of effect on the output signal of any scanner.

In FIG. 5B, a signal waveform is shown which is representative of an output signal of a scanner crossing the first six bars of the bar code (reading from the left) as shown in FIG. 5A. The waveform drawing is only approximately scaled, and no lack of accuracy or other characteristic is to be implied from the drawing. The solid line represents the output of the scanner after it has been amplified and had an appropriate DC offset applied. The dashed line represents the output of the ratio switching network 30. The signal period 70 represents the "free air" signal level. The period 72 represents the scanner output for some part of the white border of the bar code of FIG. 5A. The period 74 represents the first black bar and the period 76, the first space. It will be seen that during the period 72, the level of the reference signal is approximately two-thirds the value of the analog input signal. At a point 78, the analog signal makes the white to black transition, the negative peak detector is cleared and the ratio switched to one-third. The positive peak detector will still be maintaining the level of period 72, and the reference signal will, after an initial pulse, track the direction of the analog signal until reaching the point of one-third the difference between the previous positive peak and the present negative peak. This pattern repeats on each half cycle; for example, during the period 76, the positive peak is at the level A1, the following negative peak is at level B1 and the reference level C1 is at one-third the difference. During a period 79, the negative peak detector is held at level B2, the following positive peak value is at level A2, and the reference level is two-thirds of the difference. It can easily be seen here that a "median" level for the reference would not have provided a satisfactory digitized signal since the width of the space represented by the level A2 would be severely distorted, if not missed altogether. Since each threshold value is based on the very latest peak data available, the widths of the bars and spaces are more accurately detected than with an "average" or "median-type" threshold.

It will be seen that with the reference level moved in the direction of any current input signal peak, the input signal, during the next transition, will cross the reference level sooner that it would if an average peak-to-peak value had been established as the reference. By maintaining the reference signal level at predetermined ratios of the difference voltage between the present and last peak values, the reference level is automatically adjusted to provide for low contrast signals. Thus, the circuit combines the advantages of a reference signal which is always relatively near the present peak value and one which is more nearly constant and centered for detecting low contrast signals.

FIG. 5C indicates the approximate digitized output of the comparator 24 with the signal from the sample and hold amplifier 18 and the reference signal from the point 42 as the comparator inputs. It will be recognized that any analog waveform, no matter how irregular, could be digitized in the same fashion.

Figure 6:
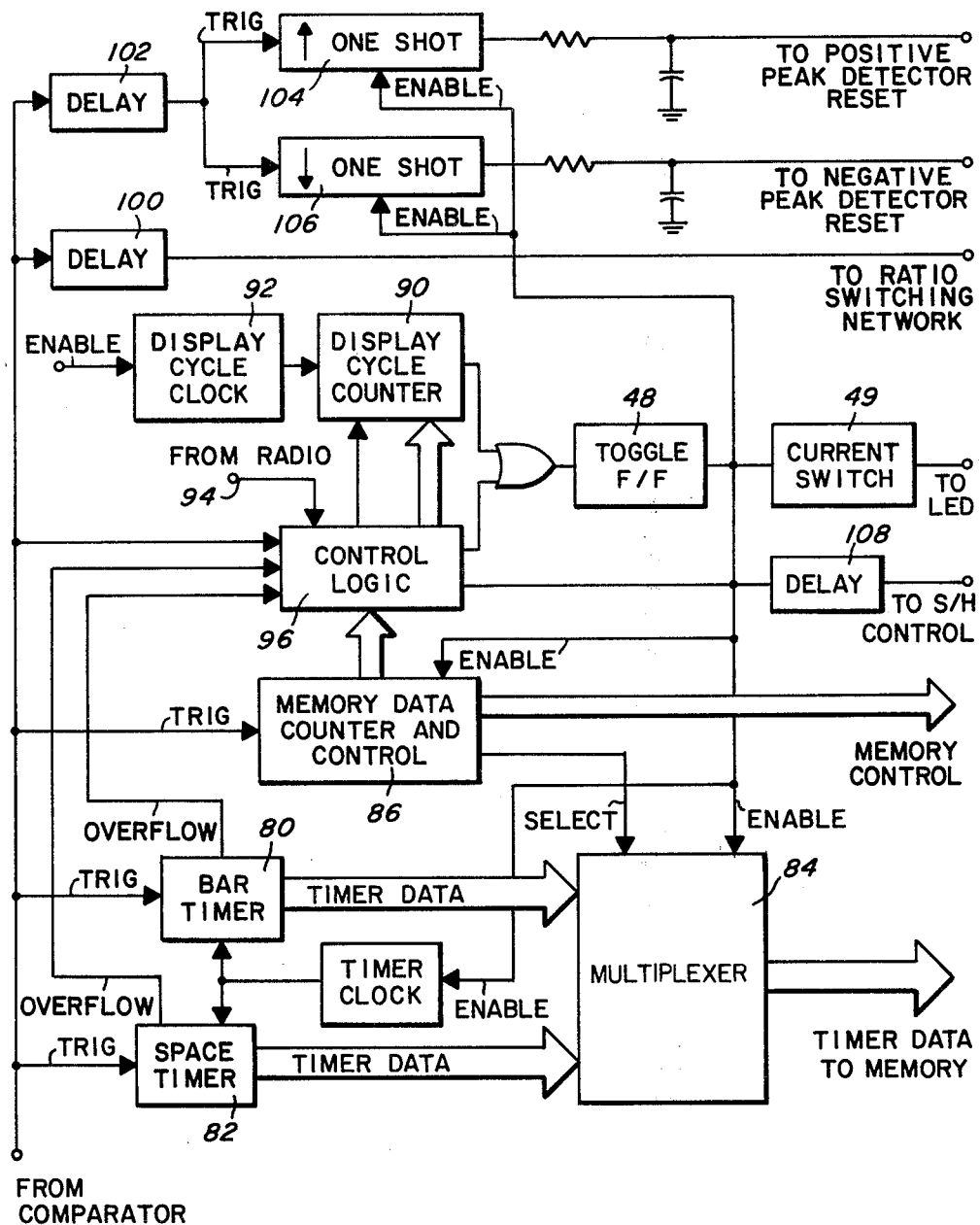
FIG. 6 is a block diagram illustrating control functions.

The diagram of FIG. 6 illustrates an embodiment of the invention in the context of a bar code scanner, with a number of elements as typically used in scanner interfaces. Such items as a bar timer 80, space timer 82, multiplexer 84, memory data counter and control 86, display cycle counter 90 and display cycle clock 92 are well known and need not be discussed further. In one particular embodiment of the invention the signals as determined by the scanner and interface are transmitted to a central control unit, usually including a large computer, and signals may also be received from the radio receiver. This is indicated in FIG. 6 as a terminal 94 coupled to control logic 96. A delay 100 is coupled between the comparator 24 output and the ratio switching network 30. A delay 102 is coupled between the comparator and a pair of one shots 104 and 106 which are enabled by the control logic block 96 and which control the resets for the positive peak detector 20 and negative peak detector 22 respectively. A delay 108 is also inserted between the flip-flop 48 and the sample and hold control 14.

Thus, there has been shown and described means for providing increased accuracy in the decoding of an analog signal such as the output of a bar code scanner. Resetting the peak detectors in the scanner interface during each cycle and switching the value of the reference or threshold signal to a predetermined fraction of the difference between the previous peak value and the present peak value provides for more accurate decoding of the bar code pattern. A DC offset at the interface input allows for more tolerance in the characteristics of a scanning device used with the interface, and utilization of the decoded signal to control the duty cycle of the scanner light source provides considerable power saving in a battery-powered device. It will be apparent that many modifications and variations of the present invention are possible and it is intended to cover all such as fall within the spirit and scope of the appended claims.

What is claimed is:

1. An interface circuit as for a bar code scanner and comprising:
   DC coupled input means for receiving a signal varying in DC level and peak values;
   positive peak detector means coupled to the input means;
   negative peak detector means coupled to the input means;
   reset means coupled to reset the peak detectors during each signal cycle, one after each signal transition;
   switchable reference means coupled to the positive and negative peak detector means outputs for providing a reference signal having an instantaneous value equal to the last detected peak value summed with a fixed fraction of the difference between the last detected peak value and the presently detected peak value, said fixed fraction being substantially greater than one-half;
   comparator means coupled to the outputs of the input means and the switchable reference means; and
   output means coupled to the comparator means.

2. An interface circuit in accordance with claim 1 wherein the switchable reference means includes a resistive network, an output terminal and a voltage-controlled switch, coupled to vary the voltage at the output terminal as a function of the output voltages at the peak detector outputs, the switch being controlled by the last signal transition detected.

3. An interface circuit in accordance with claim 1 and wherein the input means includes amplifier means for amplifying and adding a DC offset signal to the input signal.

4. An interface circuit in accordance with claim 3 wherein the input means further includes sample-and-hold means and switching means.

5. An interface circuit in accordance with claim 4 wherein the switching means is controlled in response to the input signal characteristics.

6. An interface circuit in accordance with claim 5 wherein said signal characteristics include level of signal and time between signal transitions.

7. An interface circuit in accordance with claim 5 and further including second switching means responsive to the input signal characteristics for pulsing an external circuit at a low duty cycle.

8. An interface circuit in accordance with claim 1 and further including hysteresis means coupled to the outputs of the peak detector means for providing a symmetrical hysteresis signal to the comparator means.

* * * * *